(12) United States Patent
Hundegger

(10) Patent No.: US 9,541,569 B2
(45) Date of Patent: Jan. 10, 2017

(54) MEASUREMENT APPARATUS AND WOOD PROCESSING SYSTEM WITH SUCH A MEASUREMENT APPARATUS

(71) Applicant: Hans Hundegger, Hawangen (DE)

(72) Inventor: Hans Hundegger, Hawangen (DE)

( * ) Notice: Subject to any disclaimer, the term of this patent is extended or adjusted under 35 U.S.C. 154(b) by 251 days.

(21) Appl. No.: 14/260,983

(22) Filed: Apr. 24, 2014

(65) Prior Publication Data

US 2014/0318242 A1 Oct. 30, 2014

(30) Foreign Application Priority Data

Apr. 26, 2013 (DE) ........................ 10 2013 104 241

(51) Int. Cl.
| | | |
|---|---|---|
| *G01P 1/02* | (2006.01) | |
| *G01P 1/04* | (2006.01) | |
| *B27C 1/12* | (2006.01) | |
| *B23Q 7/03* | (2006.01) | |
| *B23Q 17/22* | (2006.01) | |

(52) U.S. Cl.
CPC . *G01P 1/04* (2013.01); *B23Q 7/03* (2013.01); *B23Q 17/22* (2013.01); *B27C 1/12* (2013.01)

(58) Field of Classification Search
CPC ............. B23Q 7/03; B23Q 17/22; B27C 1/12; B65G 2201/0282
USPC ........................................... 73/493; 198/842
See application file for complete search history.

(56) References Cited

U.S. PATENT DOCUMENTS

| | | | |
|---|---|---|---|
| 3,182,877 A | 5/1965 | Slator et al. | |
| 4,742,854 A | 5/1988 | Forslund | |
| 4,776,453 A * | 10/1988 | Miller | B65G 17/24 198/465.3 |
| 5,069,440 A * | 12/1991 | Lazzarotti et al. | B65G 47/2445 198/415 |
| 5,094,340 A | 3/1992 | Avakov | |
| 5,775,417 A | 7/1998 | Council | |
| 6,880,629 B2 | 4/2005 | Schroeder | |

(Continued)

FOREIGN PATENT DOCUMENTS

| | | |
|---|---|---|
| DE | 2927751 A1 | 1/1981 |
| DE | 3143867 A1 | 5/1983 |

(Continued)

OTHER PUBLICATIONS

Canadian Office Action for related Canadian Application No. 2,847,963 dated Oct. 28, 2015, pp. 1-5.

(Continued)

*Primary Examiner* — Lisa Caputo
*Assistant Examiner* — Roger Hernandez-Prewit
(74) *Attorney, Agent, or Firm* — Paul D. Bianco; Katharine Davis; Fleit Gibbons Gutman Bongini & Bianco PL

(57) ABSTRACT

A measurement apparatus for the detection of the feed movement of a workpiece to be processed, which has a belt or chain, which is guided on a carrier via deflection disks, a pressure device, which is moved along in its movement direction with the belt or the chain for the pressing of the belt or the chain against the workpiece, and a sensor for the detection of the movement of the belt or the chain. An accurate measurement can be attained in that the carrier on a holder can be rotated around a swivel axis, which is at a right angle to the direction of movement of the belt or the chain.

18 Claims, 3 Drawing Sheets

(56) References Cited

U.S. PATENT DOCUMENTS

| | | | |
|---|---|---|---|
| 7,014,033 B2 * | 3/2006 | Sticht et al. ........... | B65G 43/10 198/345.3 |
| 2013/0056334 A1 | 3/2013 | Hundegger | |

FOREIGN PATENT DOCUMENTS

| | | |
|---|---|---|
| DE | 3712303 A1 | 10/1987 |
| EP | 0185788 A1 | 7/1986 |
| FR | 2128182 A1 | 10/1972 |
| JP | 2014172293 A | 9/2014 |

OTHER PUBLICATIONS

Australian Office Action for related Australian Patent Application No. 2014201886 dated Jun. 1, 2015, pp. 1-3.
Japanese Office Action for related Japanese Patent Application No. JP2014-076872 dated Nov. 4, 2015, pp. 1-4.

* cited by examiner

Fig. 5
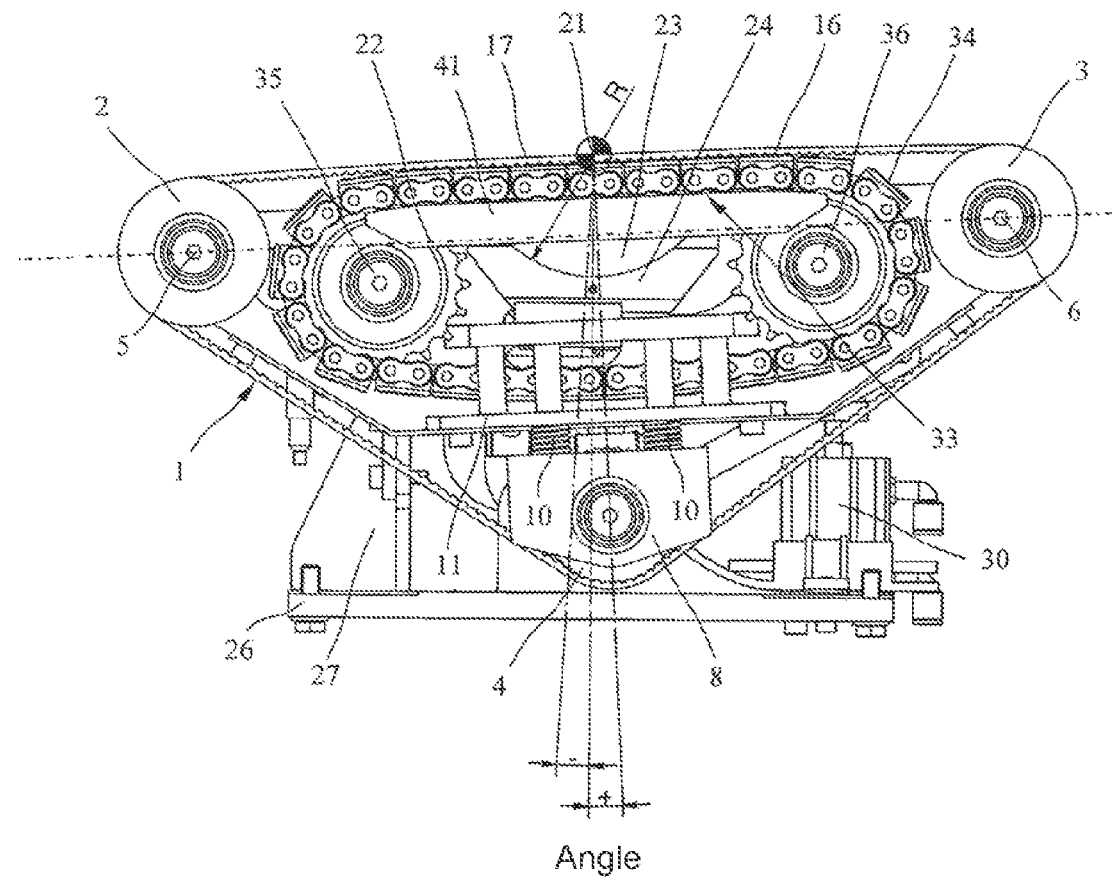
Angle
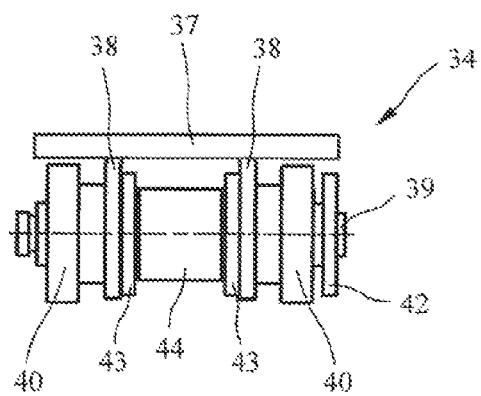
Fig. 6

MEASUREMENT APPARATUS AND WOOD PROCESSING SYSTEM WITH SUCH A MEASUREMENT APPARATUS

BACKGROUND OF THE DISCLOSURE

The disclosure concerns a measurement apparatus for the detection of the feed movement of a workpiece to be processed. Moreover, the disclosure concerns a wood processing system with such a measurement apparatus.

BACKGROUND OF THE DISCLOSURE

Such a measurement apparatus is known from DE 20 2011 105 077 U1. There, the feed movement of a workpiece by a belt arrangement with a belt that is conducted over deflection rollers and pressed against the workpiece is detected. To this end, the belt is pressed by the pressure elements that are also moved with it, for example, against the underside of a workpiece that is moved on a workpiece support in the longitudinal direction. By means of the pressure elements moved along with the belt, the belt can be pressed against the workpiece to attain a slip-free connection with the workpiece, without a sliding friction appearing between the pressure element and the belt. On at least one of the deflection disks of the belt, a sensor or another suitable device for the detection of its rotating movement can be located. By detecting the rotating movement of the deflection disk that is driven by the workpiece via the belt, it is thus possible to detect the movement of the workpiece and to measure it slip-free. However, the belt arrangement in this known measurement apparatus has only limited movement possibilities, which, in particular with irregularly shaped workpieces, can lead to measurement inaccuracies.

SUMMARY OF THE DISCLOSURE

A goal of an embodiment is to create a measurement apparatus and a wood processing system that is equipped with such a measurement device, which will produce as accurate as possible a detection of the feed movement of a workpiece.

In the measurement device in accordance with the invention, the carrier with the belt or the chain that is conducted on it over deflection disks is supported on a holder so it can rotate around a swivel axis at a right angle to the movement direction of the belt or the chain. In this way, the belt or the chain can be better adapted to the workpiece and the measurement accuracy is improved.

In a preferred embodiment, the swivel axis of the carrier lies in a range that extends from a plane formed by the rotating axes of the swivel disks in the direction of a placement section formed by the belt or the chain for the placement on the workpiece. Preferably, the swivel axis is thereby located on the outside of the placement section, for contact with the workpiece, formed by the belt or the chain, in the center between the two deflection disks. In this way, measurement errors that are caused by unevenness of the workpiece can be avoided in a particularly effective manner.

An accurate and stable support of the carrier can be attained, for example, in that the carrier is supported via a convex support part in a concave support shell corresponding to it. The support shell can protrude through an opening of the carrier and be fastened to the holder.

A displacement of the belt or the chain in the direction of the workpiece or away from it can be attained in that the holder can be conducted on a frame via a linear guide in a displaceable manner, and can be adjusted by a drive.

The pressure device moved along with the belt or the chain can be designed, for example, in the form of a chain or a second belt. In an advantageous embodiment, the pressure device has several pressure elements moved along with the belt or the chain in their movement direction. The pressure elements can be connected with one another, for example, by chain link plates, to form an endless chain and can be guided via at least two chain deflection wheels. The two chain deflection wheels that lie in one plane are appropriately located in a plane between the two deflection disks of the belt in such a way that the pressure elements are placed on the inside of the placement section of the belt that is located between the two deflection disks. Since the pressure elements move along with the belt or the chain, the belt or the chain can be pressed against the workpiece, so as to attain a slip-free connection with the workpiece without a sliding friction appearing between the pressure element and the belt or the chain. In this way, for example, the movement of a workpiece can be determined accurately and in a slip-free manner. In another development, the pressure device, however, could also be designed as a belt that is moved along.

Expediently, the pressure elements are pressed by a pressure plate against the inside of the belt. The pressure plate can be placed between the chain deflection wheels and is constructed in such a way that the pressure elements are pressed against the inside of the belt in case of an overrun over the pressure plate and, for example, press this against the underside of a workpiece. To this end, the pressure plate can have a ramp-shaped pattern. The pressure plate can also swivel around a horizontal axis. In this way, the pressure elements can also be pressed well against irregular workpieces.

In order to attain the lowest possible friction between the pressure elements and the pressure plate, rollers supported so they can rotate between the pressure elements, for placement against the pressure plate, can be located on the pressure elements or also on the connecting elements.

In a particularly expedient development, the belt is guided via two deflection disks located in one plane and a third disk staggered relative to these, wherein the third disk is pressed by springs against the inside of the belt.

The previously described measurement apparatus can be preferably used to detect the movement of a workpiece on a plate processing system, an assembly system, or a similar wood processing system. To this end, the belt or the chain is pressed by the pressure elements moved along with it, for example, against the underside of a workpiece moved on a workpiece support in a longitudinal direction. A sensor or another suitable device for the detection of its rotating movement can be located on at least one of the deflection disks. By the detection of the rotating movement of the deflection disk driven by the workpiece via the belt or a chain, the movement of the workpiece can be detected and measured slip-free. The movement of the belt or the chain can, however, also be detected directly by other suitable measurement devices. Thus, for example, the number of teeth of a toothed belt that moves past a suitable detector could also be detected and could be used for direct measurement of the belt movement. Also, other measurement devices would be suitable for the detection of the belt or chain movement.

BRIEF DESCRIPTION OF THE DRAWINGS

Other peculiarities and advantages of the invention can be deduced from the following description of a preferred embodiment example with the aid of the drawing. The figures show the following:

FIG. 5, the measurement apparatus of FIG. 3 in a swiveled position; and

FIG. 6, a pressure element in a side view.

DETAILED DESCRIPTION OF THE DISCLOSURE

Figure 1:
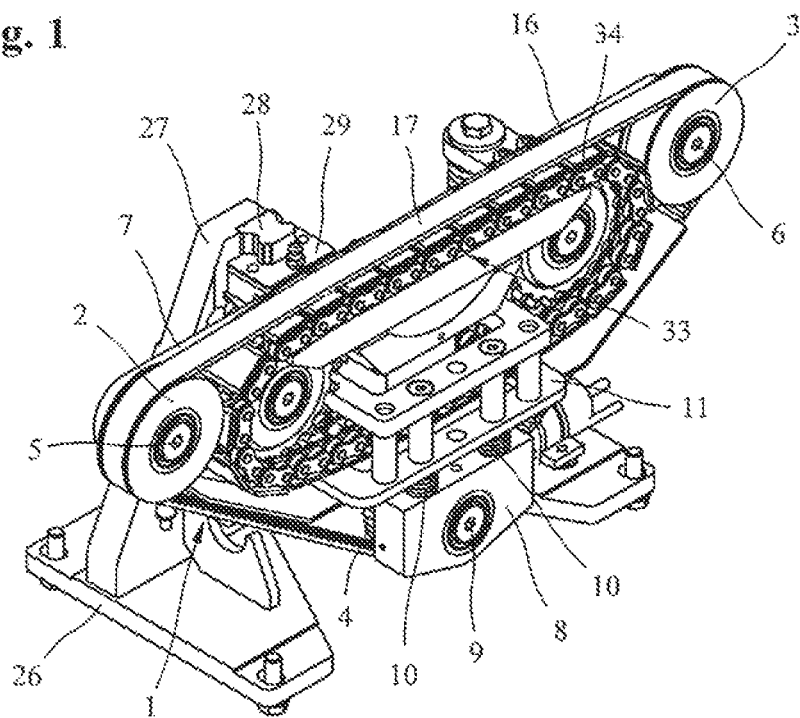
FIG. 1, a measurement apparatus in accordance with the invention in a view from the front.
Figure 2:
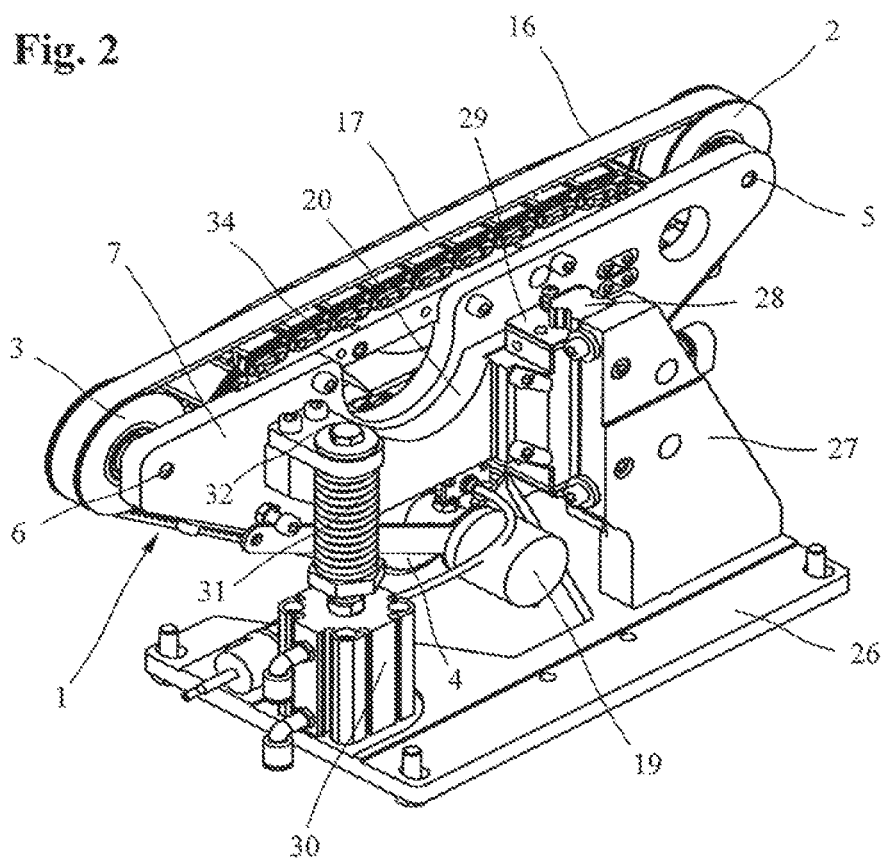
FIG. 2, the measurement apparatus of FIG. 1 in a view from the rear.

The measurement apparatus shown in a front and rear view in FIGS. 1 and 2 contains a belt 1, designed here as an endless toothed belt, which is conducted around two deflection disks 2 and 3 lying in one plane and a third disk 4 staggered relative to them. The two deflection disks 2 and 3 are supported in such a way that they can rotate around rotating axes 5 and 6 on a plate-shaped carrier 7. The disk 4 is supported within a mounting 8, which can be seen in FIG. 1, in such a way that it can rotate around a rotating axis 9. The mounting 8 is installed on a holder 11, fastened on the carrier 7 and is prestressed by two springs 10. By means of the two springs 10, the mounting 8 with the disk 4 supported in such a way that it can rotate therein is pressed away from the holder 11, fastened on the carrier 7, against the inside of the belt 1, so that it is under tension.

The two deflection disks 2 and 3 and the disk 4 are constructed as toothed disks for form-locking engagement with the belt 1 designed here as an endless toothed belt. The belt arrangement is designed in such a way that the area or section of the belt 1 running between the two deflection disks 2 and 3 serves as a placement section 16 for placement on a workpiece 15 shown in FIG. 3 and with its outside 17 at least partially is sufficient for placement on an area of the workpiece 15. The workpiece 15, which is constructed, for example, as a wooden beam, a wooden plate, or the like, lies on a roller path formed here by transport rollers, or another suitable workpiece support 18 of a plate processing system or a similar wood processing system, and for processing, can be transported by a transporting apparatus which is not depicted here, along the workpiece support. When moving the workpiece 15 in the direction of its longitudinal axis, the belt 1 is moved along by friction contact on the workpiece 15 and can be used for the detection of the movement of the workpiece 15.

In the embodiment example shown, the belt arrangement is therefore a part of a measurement device for the detection of the movement of the workpiece 15 moved in the longitudinal direction, wherein here, the third disk 4 is connected with a rotary encoder or another suitable sensor 19 for the detection of the rotating movement of the disk 4. By detecting the rotating movement of the disk 4 driven by the workpiece 15 via the belt 1, the movement of the workpiece 15 can thus be detected. The sensor 19, which can be seen in FIGS. 2 and 4, however, could also be placed on one of the deflection disks 2 and 3.

As can be seen, in particular, from FIG. 5, the carrier 7 is supported on a plate-shaped holder 20 shown in FIG. 2 so it can swivel in such a way that it can rotate around a swivel axis 21 (vertical to the sheet plane in FIG. 5), which is at a right angle to the direction of movement of the belt 1. The swivel axis 21 of the carrier 7 lies in an area that extends from a plane 22 formed by the rotating axes 5 and 6 of the deflection disks 2 and 3 in the direction of the placement section 16 formed by the belt 1. In the embodiment shown, the swivel axis 21 lies in the center between the two deflection disks 2 and 3 on the outside 17 of the belt 1 designed for contact with the workpiece 15. In the embodiment shown, the swivel capacity of the carrier 7 can be attained in that the carrier 7 is supported via a convex support part 23 in a concave support shell 24 corresponding to it.

Figure 4:
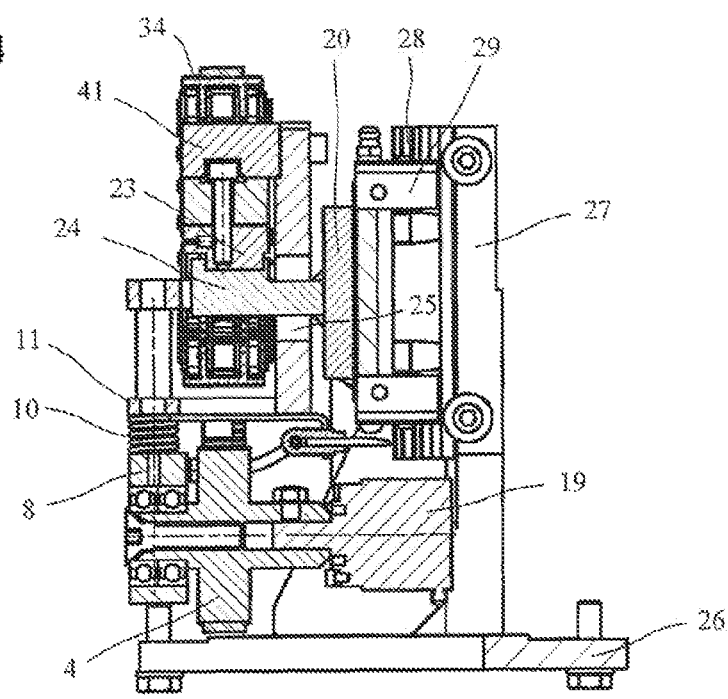
FIG. 4, a sectional view along arrows A-A of FIG. 3.

In FIG. 4, one can see that the support shell 24 protrudes through an opening 25 of the carrier 7 and is fastened to the plate-shaped holder 20. The belt 1 is delivered in the direction of the workpiece 15 in the embodiment example shown, in that the plate-shaped holder 20 is guided via a linear guide in a displaceable manner on a frame formed from a bottom plate 26 and a console 27 and can be adjusted by means of a drive.

The linear guide comprises a guide track 28 fastened to the console 27, and a carriage 29 guided, in a displaceable manner on the guide track 28, which is fastened in accordance with FIG. 2 on one end of the plate-shaped holder 20. The drive contains a hydraulically or pneumatically actuatable adjustment cylinder 30, whose piston rod is connected via a spring 31 and a holder plate 32 with the other end of the plate-shaped holder 20. By steering the adjustment cylinder 30, the carrier 7 can be raised or lowered relative to the bottom plate 26, and therefore moved toward the workpiece 15 or away from it, wherein the pressing of the placement section 16 on the workpiece 15 can be changed.

In order to move along the belt 1 as slip-free as possible when the workpiece 15 is moved, the placement section 16 of the belt 1 is pressed by a pressure device 33 against the workpiece 15. The pressure device 33 comprises several pressure elements 34, which are moved along with the belt 1 in its transport direction, and which, in the embodiment shown, are part of an endless chain conducted around two chain deflection wheels 35 and 36. In the embodiment shown, the two chain deflection wheels 35 and 36 supported so they can be rotated on the carrier 7 are constructed as toothed wheels.

Figure 3:
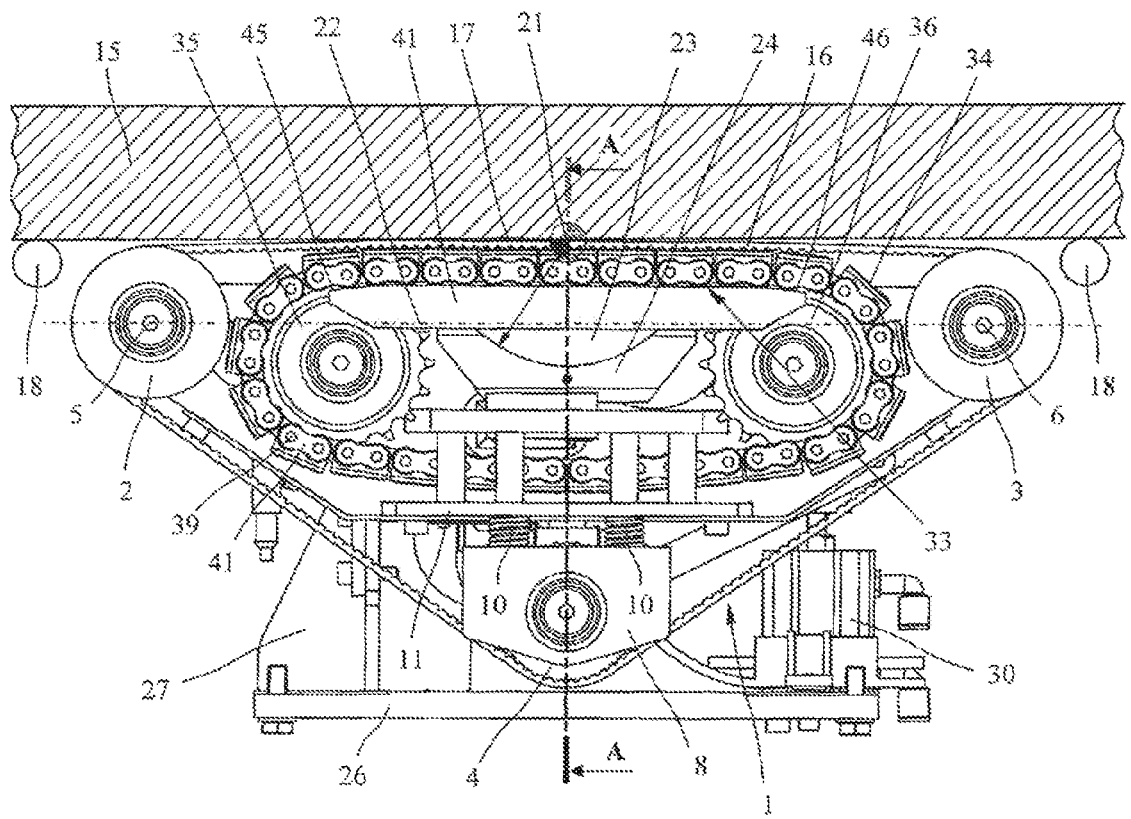
FIG. 3, the measurement apparatus of FIG. 1 in a side view.

The pressure elements 34 shown in FIG. 6 consist of a basic body with an upper pressure part 37 and two legs 38, which protrude downward through which two axles 39 run with rollers 40 supported so they can rotate on both sides for support on a pressure plate 41 shown in FIGS. 3 and 5. The rollers 40 are held by an external chain plate 42 sitting on the ends of the axles 39. The pressure elements 11 are connected with one another by internal chain plates 43 shown in FIG. 3 to form the endless chain, guided via the chain deflection wheels 35 and 36. A sleeve 44 is located between the inner chain plates 43.

By means of the rollers 40 located on the axles 39 on both sides of the pressure element 34, the pressure elements 34 slide on the pressure plate 41 as friction-free and wear-free as possible. The pressure plate 41 located between the chain deflection wheels 35 and 36 is constructed in such a way that the pressure elements 34 are pressed against the belt 1 when they run over the pressure plate 41 and press the belt against the underside of the workpiece 15. To this end, the pressure plate 41 has a ramp-shaped course, which can be seen, in particular, in FIG. 3, with a front ramp area 45, which rises, in a movement direction of the pressure elements 34, rises at an incline to the pressure elements 34, and a rear ramp area 46, which falls at an incline.

In the embodiment shown, the previously described measurement apparatus is used for the measurement of a workpiece on a plate processing system or a similar wood processing system. The measurement apparatus is integrated into a transport path or another workpiece support of the wood processing system in such a way that the placement section 16 of the belt 1, for example, serves for placement on the underside of the workpiece 15 lying on the transport path and transported in the longitudinal direction. Of course, the belt can also serve for placement on other side areas of the workpiece 15. If the workpiece 15 is moved in the longitudinal direction by a transport apparatus, which is not shown here, then the belt 1 is pressed by the pressure elements 34 against the underside of the workpiece 15 as a result of friction and transfers its movement to the disk 4, on which the sensor 19 for the detection of the rotating movement of the disk 4 is located. In this way, the feed movement of the workpiece 15 can be detected and measured. Since the pressure elements 34 move together with the belt 1 and no relative movement takes place between the pressure elements 34 and the belt 1, there is no sliding friction between the pressure elements 34 and the belt 1.

The previously described measurement apparatus is not limited to the application purpose that is explained in detail. Thus, the belt arrangement could also be used for transporting a workpiece if, for example, one or more of the deflection disks are driven. At the same time, a measurement of the movement of the workpiece can also take place. Instead of the belt 1, moreover, a chain or a similar pulling element could also be used, which is pressed against the workpiece 15 via the previously described pressure device 33 and could be used in a slip-free connection with the workpiece 15 by suitable friction or form-locking elements.

The invention claimed is:

1. A measurement apparatus detecting feed movement of a workpiece that is to be processed, the measurement apparatus comprising:
   a belt or chain guided on a carrier via a plurality of deflection disks, a portion of the belt or chain movable in a movement direction; a pressure device having a plurality of pressure elements which move along the belt or chain in the movement direction so as to press the belt or chain against the workpiece; and a sensor connected to one of the plurality of deflection disks to detect movement of the belt or chain,
   wherein the carrier is rotatable on a holder around a swivel axis at a right angle to the movement direction.

2. The measurement apparatus of claim 1, wherein the swivel axis of the carrier lies in an area that extends from a plane formed by the rotating axes of two of the plurality of deflection disks in a direction of a placement section formed by the belt or chain for placement on the workpiece.

3. The measurement apparatus of claim 2, wherein the swivel axis lies in a center between two of the plurality of deflection disks.

4. The measurement apparatus of claim 1, wherein the carrier is supported via a convex support part in a concave support shell corresponding to the convex support part.

5. The measurement apparatus of claim 4, wherein the shell support protrudes through an opening of the carrier and is fastened to the holder.

6. The measurement apparatus of claim 1, wherein the holder is guided via a linear guide so that the holder is displaceable on a frame and can be adjusted by a drive.

7. The measurement apparatus of claim 6, wherein the linear guide comprises a guide track, which is fastened to a console of the frame, and a carriage, which is guided so that the carriage is displaceable on the guide track and on which the holder is fastened.

8. The measurement apparatus of claim 6, wherein the drive contains a hydraulically or pneumatically actuatable adjustment cylinder with a piston rod connected with the holder via a spring and a holder plate.

9. The measurement apparatus of claim 1, wherein the plurality of pressure elements are connected to form an endless chain and are guided via at least two chain deflection wheels.

10. The measurement apparatus of claim 9, wherein the chain deflection wheels are located between deflection disks supported on the carrier so the chain deflection wheels can rotate.

11. The measurement apparatus of claim 9, wherein the plurality of pressure elements are connected by chain plates.

12. The measurement apparatus of claim 9, wherein the plurality of pressure elements are guided against an inside of the belt or chain via a pressure plate.

13. The measurement apparatus of claim 9, wherein each of the plurality of pressure elements includes rollers supported so the rollers are rotatable.

14. The measurement apparatus of claim 1, wherein at least two of the plurality of deflection disks are supported on the carrier.

15. The measurement apparatus of claim 1, wherein one of the plurality of deflection disks is supported within a mounting of a disk holder and the disk holder is connected to the carrier.

16. A wood processing system with at least one processing unit and a measurement apparatus for measurement of feed movement of a wooden workpiece to be processed, the measurement apparatus comprising:
   a belt or chain guided on a carrier via a plurality of deflection disks, a portion of the belt or chain movable in a movement direction; a pressure device having a plurality of pressure elements which move along with the belt or chain in the movement direction so as to press the belt or chain against the workpiece; and a sensor connected to one of the plurality of deflection disks to detect movement of the belt or chain,
   wherein the carrier is rotatable on a holder around a swivel axis at a right angle to the movement direction.

17. The wood processing system of claim 16, wherein the measurement apparatus is located above and/or below and/or laterally and/or in a feed movement direction before and/or behind the at least one processing unit.

18. The wood processing system of claim 16, wherein the measurement apparatus is integrated into a workpiece support for the workpiece.

* * * * *